United States Patent [19]
Aoki et al.

[11] Patent Number: 5,786,945
[45] Date of Patent: Jul. 28, 1998

[54] ZOOM LENS SYSTEM

[75] Inventors: Norihiko Aoki, Sagamihara; Atsujiro Ishii, Hoya, both of Japan

[73] Assignee: Olympus Optical Co., Ltd., Tokyo, Japan

[21] Appl. No.: 659,006

[22] Filed: Jun. 4, 1996

[30] Foreign Application Priority Data

Jun. 6, 1995 [JP] Japan ................. 7-139451

[51] Int. Cl.$^6$ .......................... G02B 15/14; G02B 13/18
[52] U.S. Cl. .............................. 359/692; 359/714
[58] Field of Search .......................... 359/692, 689, 359/690, 714

[56] References Cited

U.S. PATENT DOCUMENTS

| | | | |
|---|---|---|---|
| 5,301,065 | 4/1994 | Lee | 359/692 |
| 5,610,767 | 3/1997 | Ito | 359/689 |

FOREIGN PATENT DOCUMENTS

| | | |
|---|---|---|
| 61-087119 | 5/1986 | Japan. |
| 61-087120 | 5/1986 | Japan. |
| 6-006917 | 1/1990 | Japan. |
| 3-127008 | 5/1991 | Japan. |
| 3-127009 | 5/1991 | Japan. |
| 3-127010 | 5/1991 | Japan. |
| 3-158815 | 7/1991 | Japan. |

*Primary Examiner*—Scott J. Sugarman
*Attorney, Agent, or Firm*—Cushman Darby Cushman IP Group of Pillsbury Madison & Sutro LLP

[57] ABSTRACT

The invention provides a compact, lightweight yet low-cost zoom lens system which has a zoom ratio of at least about 2 and is well corrected for various aberrations, and in which sufficient attention is paid to temperature compensation when plastic lenses are used. The zoom lens system comprises in order from an object side a front lens group GF including a plurality of positive lenses containing at least a plastic lens and having a positive refracting power as a whole, and a rear lens group GR composed only of a plurality of negative lenses containing at least a plastic lens, wherein zooming is carried out by varying the spacing between the front and rear lens groups, and all the lenses satisfy the following condition (1):

$$n_d < 1.75 \tag{1}$$

where $n_d$ is the d-line indices of refraction of the lenses.

21 Claims, 6 Drawing Sheets

(Wide-angle)

(Intermediate)

(Telephoto)

(Wide-angle)

(Intermediate)

(Telephoto)

(Wide-angle)

(Intermediate)

(Telephoto)

(Wide-angle)

(Intermediate)

(Telephoto)

(Wide-angle)

(Intermediate)

(Telephoto)

ZOOM LENS SYSTEM

BACKGROUND OF THE INVENTION

The present invention relates generally to a zoom lens system, and more particularly to a compact, lightweight yet low-cost zoom lens system using plastic lenses, which is best suited for use on lens shutter cameras.

So far, a lens type with a front positive lens group and a rear negative lens group has been known for zoom lens systems which are applied to lens shutter cameras with a zoom ratio of about 2. To this type of zoom lens system, how efficiently the magnification of the rear negative lens group is increased is a key because it makes a chief contribution to zooming. A zoom lens system, however, is desired to be corrected for chromatic aberration for each lens group, and it is general that at least one positive lens is used even for the rear negative lens group for the purpose of making chromatic aberration correction. As a result, however, it is necessary to make the refracting power of the negative lens larger than required; so it is difficult to obtain any desired zoom ratio and correct aberrations other than chromatic aberration, especially curvature of field. At the same time, there is an increase in the number of lenses involved, which in turn offers a cost problem or incurs some considerable expense. If the rear group should be composed of negative lenses alone, the number of lenses used is to be reduced or higher zoom ratios are to be achieved by use of the same number of lenses. This, however, is contrary to making satisfactory correction for chromatic aberration.

Zoom lens systems having a rear group composed of negative lenses alone with a well-balanced compromise between chromatic aberration performance and zooming ratio are typically disclosed in JP-A-61-87119, JP-A-61-87120, JP-A-2-6917, JP-A-3-127008, JP-A-3-127009, JP-A-3-127010, JP-A-3-158815, JP-A-3-168608, JP-A-3-274521, JP-A-6-331889, and U.S. Pat. No. 5,301,065.

On the other hand, compact zoom lens systems for use on lens shutter cameras are required to be reduced in terms of size, weight, and cost. To meet these requirements, the use of plastic lenses have been attempted. Exemplary zoom lens systems having a rear lens group composed of negative lenses alone and a plastic lens or lenses incorporated therein are disclosed in JP-A-2-6917, JP-A-3-127008, JP-A-3-127009, JP-A-3-158815, JP-A-3-274521, JP-A-6-331889, and U.S. Pat. No. 5,301,065, all mentioned just above.

All the examples are directed to lens systems wherein one or more lenses are formed of plastic lenses for the purpose of cost reductions. Nowhere in these publications, however, is there any lens system having a zoom ratio of about 2 and well corrected for various aberrations disclosed. Nor do they refer to a particular problem associated with the use of plastic lenses, i.e., temperature compensation.

SUMMARY OF THE INVENTION

An object of the present invention, accomplished with the above-mentioned problems with the prior art in mind, is to provide a compact, lightweight yet low-cost lens system which is designed while sufficient attention is paid to temperature compensation incidental to the use of a plastic lens or lenses, and is well corrected for various aberrations with a zoom ratio of at least about 2.

According to one aspect of the present invention, the above-mentioned object is achieved by the provision of a zoom lens system characterized by comprising, in order from an object side, a front lens group including a plurality of positive lenses containing at least a plastic lens and having a positive refracting power as a whole, and a rear lens group composed only of a plurality of negative lenses containing at least a plastic lens, wherein zooming is carried out by varying the spacing between the front and rear lens groups and all the lenses satisfy the following condition (1):

$$n_d < 1.75 \tag{1}$$

where $n_d$ is the d-line indices of refraction of the lenses.

According to another aspect of the present invention, there is provided a zoom lens system characterized by comprising, in order from an object side, a front lens group including a positive lens located proximate to the object side and a negative lens located on an image side with respect to said positive lens, a surface of said negative lens lying on the object side being convex on the object side, and having a positive refracting power as a whole, and a rear lens group composed of negative lenses alone, wherein zooming is carried out by varying the spacing between the front and rear lens groups.

According to still another aspect of the present invention, there is provided a zoom lens system characterized by comprising, in order from an object side, a front lens group including a negative lens located proximate to the object side and a plurality of positive lenses located on an image side with respect to said negative lens and having a positive refracting power as a whole and a rear lens group composed of negative lenses alone, wherein zooming is carried out by varying the spacing between the front and rear lens groups.

In what follows, a detailed account will be given of why the above-mentioned layouts are used and how they function.

According to the first aspect of the invention, there is provided a zoom lens system characterized by comprising, in order from an object side, a front lens group including a plurality of positive lenses containing at least a plastic lens and having a positive refracting power as a whole, and a rear lens group composed only of a plurality of negative lenses containing at least a plastic lens, wherein zooming is carried out by varying the spacing between the front and rear lens groups and all the lenses satisfy the following condition (1):

$$n_d < 1.75 \tag{1}$$

where $n_d$ is the d-line indices of refraction of the lenses used.

Generally, plastics are about 100 to 1,000 times as large as glass in terms of a refractive index change depending on temperature, and so are liable to be affected by the air temperature. Especially when the refracting power of a plastic lens is increased, the focal length and the amount of aberrations produced vary largely. To compensate for such variations, for instance, it is required to build a thermometer within a camera to compensate for temperature changes in an autofocusing manner. One possible approach to minimizing the influence of temperature changes on a plastic lens is to diminish the refracting power of the plastic lens. With this approach, however, it is in principle impossible to reduce the number of lenses used. In any case, no cost reduction is achieved because of the need of using a thermometer or no reduction of the number of lenses used.

According to the lens layout of the present invention as mentioned above, it is possible to obtain a low-cost zoom lens system which is corrected for focal shifts due to temperature changes with no addition of any unnecessary part such as a thermometer even when plastic lenses having a high index of refraction are used.

In other words, temperature compensation for plastic lenses according to the present invention is achieved by using plastics for positive and negative lenses rather than by reducing the temperature change of each lens, so that the positive and negative lenses are mutually canceled out in terms of action, whereby focal shifts or other faults are corrected throughout the lens system.

Thus, satisfactory compensation can be made for temperature throughout the lens system by using at least one plastic lens for positive lenses in the front lens group of positive refracting power and at least one plastic lens for negative lenses in the rear lens group of negative refracting power.

In general, the state-of-the-art plastics usable as a visible range of optical lenses have an index of refraction of about 1.6. Accordingly, a certain lens system, when it comprises many plastic lenses, has a mean index of refraction of about 1.6 or less. In order that such a lens system has a zoom ratio of about 2, a positive lens should be located in the rear lens group to make the negative refracting power larger than required. In this layout, however, the Petzval's sum becomes too strong in the negative direction, resulting in a field tilt on the plus side at the telephoto end in particular.

In the zoom lens system of the present invention, therefore, the rear lens group is composed of negative lenses alone to distribute the negative refracting power throughout the rear lens group and so prevent the negative refracting power of each negative lens from becoming larger than required, thereby preventing any field tilt while plastic lenses are used.

Chromatic aberration is eliminated by balancing the rear lens group with the front lens group, so that the entire system can have a zoom ratio of about 2. The above-mentioned condition (1) correlates with this, and is provided to reduce curvature of field in particular. Especially when a lens having a refractive index exceeding the upper limit of 1.75 in condition (1) is used for a positive lens in a lens system composed of many plastic lenses and so having an average refractive index of about 1.6, the Petzval's sum is shifted in the negative direction largely enough to cause a field tilt on the plus side, which cannot be corrected.

By use of such construction as mentioned above it is possible to achieve the above-mentioned object of the present invention.

The present invention also provides a zoom lens system comprising, in order from an object side, a front lens group including a positive lens located nearest to the object side and a negative lens located on an image side with respect to said positive lens, a surface of said negative lens lying on the object side being convex on the object side, and having a positive refracting power as a whole, and a rear lens group composed of negative lenses alone, wherein zooming is carried out by varying the spacing between the front and rear lens groups.

In a zoom lens system of the positive and negative-group or two-group construction as contemplated in the present invention, an image formed by the front lens group of positive power is magnified by the rear lens group of negative power for zooming. It follows that unless aberrations are adequately corrected by the front lens group, they will then be enlarged by the rear lens group, resulting in degradation of the lens system at the telephoto end in particular. It is thus required to make full correction for aberrations by the front positive lens group. Now consider an image-forming system consisting of at least two lenses, positive and negative. To make correction for spherical aberration, it is general that the surface of the negative lens that faces the object side is made concave on the object side to produce positive spherical aberration at that surface, thereby making correction throughout the whole system. In this case, however, off-axis aberrations produced at that surface become worse, thus making it difficult to achieve sufficient performance all over the image surface.

Thus, the negative lens, a surface of which faces the object side is made convex on the object side, is located in the front positive lens group for the purpose of achieving a configuration favorable for off-axis aberrations, and undercorrection of spherical aberration is compensated for by composing the rear negative lens group of negative lenses alone.

By use of such construction, as mentioned above, it is possible to achieve the above-mentioned object of the present invention.

According to the third aspect of the present invention, there is provided a zoom lens system comprising, in order from an object side, a front lens group including a negative lens located nearest to the object side and a plurality of positive lenses located on an image side with respect to said negative lens and having a positive refracting power as a whole and a rear lens group composed of negative lenses alone, wherein zooming is carried out by varying the spacing between the front and rear lens groups.

A zoom lens system of the positive and negative-group or two-group type as contemplated in the present invention, because of being of the telephoto type, is characterized in that the entire length is shorter relative to the focal length. As a result, the back focus becomes too short at the wide-angle end in particular, and so dust and other contaminants on the lens surface are transferred to the surface of film. The third aspect of the present invention is best suited for making the back focus at the wide-angle end in particular sufficient while the entire length of the lens system is kept short.

More specifically, the negative lens is located proximate to the front positive lens group to move the principal point position of the front lens group toward the image side, whereby the principal point position of the entire system can be moved toward the image side to ensure that the back focus is sufficient. Further in this embodiment, at least two positive lenses are located on the image side with respect to the negative lens nearest to the object side, so that the required refracting power is achieved and axial marginal rays leaped up by the negative lens located nearest to the object side is converged while the amount of aberrations produced is kept small. Furthermore in this embodiment, the rear negative lens group is composed of a plurality of negative lenses alone to prevent any possible field tilt, so that the negative refracting power is dispersed throughout the rear lens group to prevent the refracting power of each negative lens from becoming larger than required.

By use of a symmetrical layout wherein negative lenses are located at both ends of the lens system with respect to a stop interposed between them, the lens system is corrected for chromatic aberration of magnification. Longitudinal chromatic aberration can be corrected by balancing the rear lens group with the front lens group while the amount of longitudinal chromatic aberration produced is reduced making use of a low ray height at the rear lens group. By use of such construction as mentioned above the above-mentioned object is achievable.

To minimize the number of lenses used in, view of cost reductions, it is desired in the third embodiment of the present invention that the front positive lens group comprise, in order from the object side, a negative lens, a positive lens and a positive lens, and the rear negative lens group be composed of two negative lenses for the above-mentioned reasons.

As in the first embodiment, plastic lenses are incorporated in the second or third embodiment of the invention so that temperature compensation can be made.

In other words, at least one plastic lens is used for the positive lens in the front positive lens group and at least one plastic lens is used for the negative lens in the rear negative lens group, so that cost reductions and temperature compensation can be achieved concurrently. Even in this case, more favorable results are obtained by satisfying the above-mentioned condition (1).

Further in the first to third embodiments of the invention where plastic lenses are utilized in the lens system, more favorable temperature compensation is achievable by using plastic lenses for at least one positive lens and at least one negative lens in the front positive lens group in particular. This is to compensate for the influence of the front positive lens group within the front lens group alone, because the influence of the front positive lens group is great in the entire zoom lens system having a positive refracting power as a whole.

To this end, it is desired that the following conditions (2) and/or (3) be satisified:

$$-1 < f_{NP}/f_T < 0 \quad (2)$$

$$0 < f_{PP}/f_T < 2 \quad (3)$$

where $f_{NP}$ is the focal length of at least one plastic lens used for the negative lens in the front lens group;

$f_T$ is the focal length of the entire system at the telephoto end; and $f_{PP}$ is the focal length of the plastic lens having the shortest focal length among the plastic lenses used for the positive lenses in the front lens group.

Conditions (2) and (3) are provided to make compensation for temperature in the front lens group in particular. With the upper limit of 0 in condition (2) exceeded, the negative plastic lens used in the front lens group makes too large a contribution to temperature compensation, and with the lower limit of −1 not reached, it rather makes too small a contribution, resulting in difficulty in compensation throughout the entire system. With the upper limit of 2 in condition (3) exceeded, the movement of focus in the front positive lens group due to temperature changes becomes too large to make sufficient compensation for this at the rear negative lens group. With the lower limit of 0 not reached, the movement of focus becomes too large in the opposite direction, resulting in difficulty in compensation throughout the entire system.

When at least one positive plastic lens and at least one negative plastic lens used in the front positive lens group adjoin each other, it is desired that the following condition (4) be satisfied:

$$0 < |f_{RP}/f_{FP}| < 1 \quad (4)$$

where $f_{RP}$ is the composite focal length of the plastic lenses used in the rear lens group; and $f_{FP}$ is the composite focal length of the plastic lenses used in the front lens group.

Condition (4) is provided to make compensation for temperature throughout the entire system. When the upper limit 1 is exceeded, the front and rear lens groups are ill-balanced in terms of temperature compensation, and the movement of focus becomes too large at the telephoto end in particular. To make correction for this in an autofocusing manner, it is required that a thermometer be built in a camera. However, this is not preferable because of incurring some added expense.

As a matter of course, much more favorable temperature compensation is achievable by satisfying conditions (2), (3) and (4) concurrently.

In the first to third embodiments of the invention, it is desired for correction of off-axis aberrations that the negative lens in the rear lens group be meniscus-shaped with a concave surface facing the object side. This is particularly to make a zoom lens system of the positive and negative-group or two-group type as contemplated in the present invention symmetrical with respect to a stop, because the stop is located on the object side with respect to the front lens group.

In the first to third embodiments of the invention, the use of an aspherical surface or surfaces is favorable for aberration correction. In a zoom lens system of the type as contemplated in the present invention, positive distortion generated at the wide-angle end in particular becomes a problem. Especially when at least one aspherical surface is used in the rear lens group having a large off-axis ray height for the purpose of make correction for this aberration, it is desired that in the rear lens group there be incorporated an aspherical surface for which positive refracting power becomes strong farther and farther off the optical axis. When at least one aspherical surface is used in the front positive lens group, especially for the purpose of correcting spherical aberration at the telephoto end it is desired that in the front lens group that there be incorporated an aspherical surface whose positive refracting power becomes smaller farther and farther off the optical axis. In view of cost, it is very advantageous to use plastic lenses for the aspherical surfaces.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 through 8 of the zoom lens system according to the present invention will now be explained more specifically with reference to the drawings. FIGS. 1 through 5 show in section Examples 1, 3, 5, 7 and 8 at the wide-angle ends, intermediate settings, and telephoto ends thereof. Examples 2, 4 and 6 are similar to Examples 1, 3 and 5 in terms of lens layouts, and so are not illustrated.

Figure 1A:
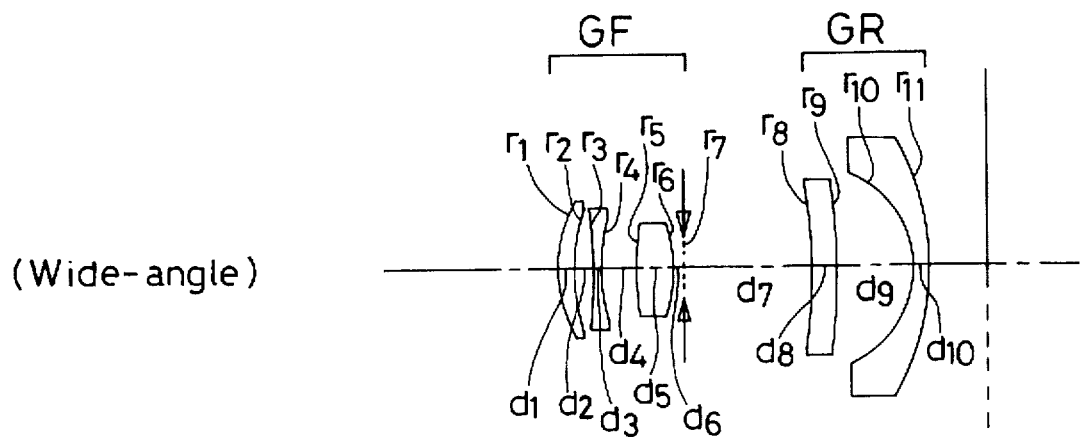
FIG. 1 shows in section Example 1 of the zoom lens system according to the present invention at the wide-angle end, intermediate settings, and telephoto end thereof.
Figure 1B:
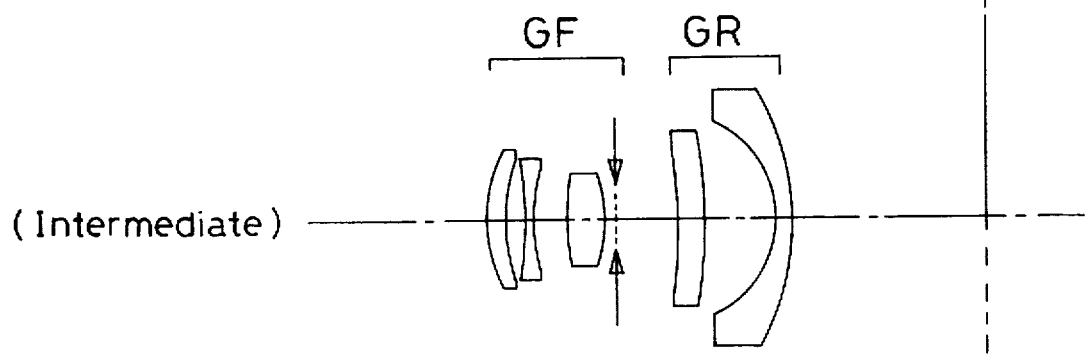
Figure 1C:
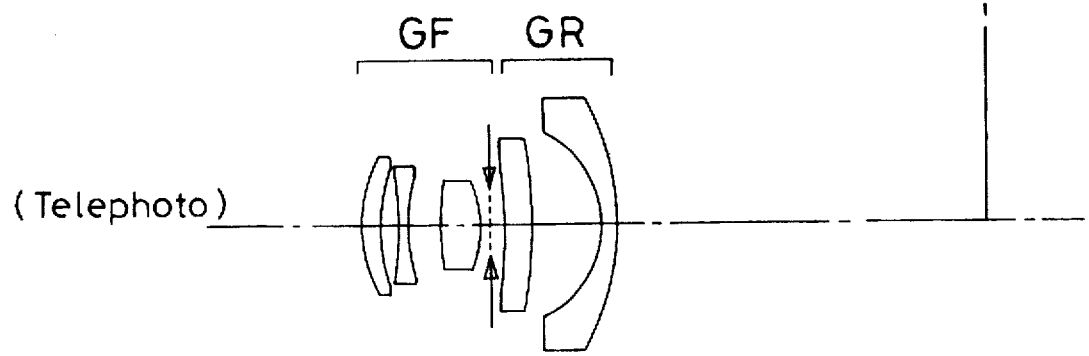

In Examples 1 and 2, a front lens group GF consists of, in order from an object side, a positive meniscus lens convex on the object side, a double concave lens and a double convex lens or three lenses in all, with a stop located behind the front lens group GF as one integral piece, as can be seen from FIG. 1. A rear lens group GR consists of two negative meniscus lenses, each convex on an image side. Two aspherical surfaces are used, one for the front surface of the double concave lens in the front lens group GF and one for the surface of the rear lens group GR that is located nearest to the object side. In both Examples 1 and 2, the second, third, fourth, and fifth lenses are formed of plastics.

Figure 2A:
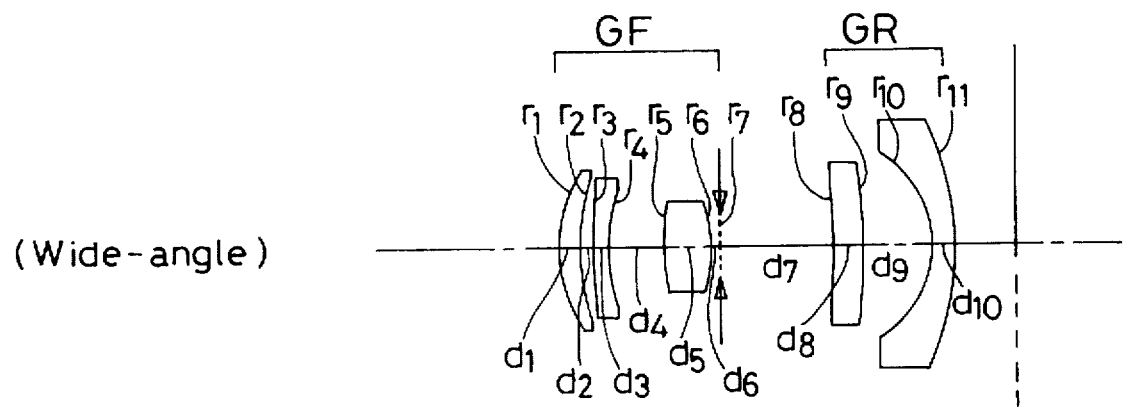
FIG. 2 is a sectional view of Example 3 of the invented zoom lens system similar to FIG. 1.
Figure 2B:
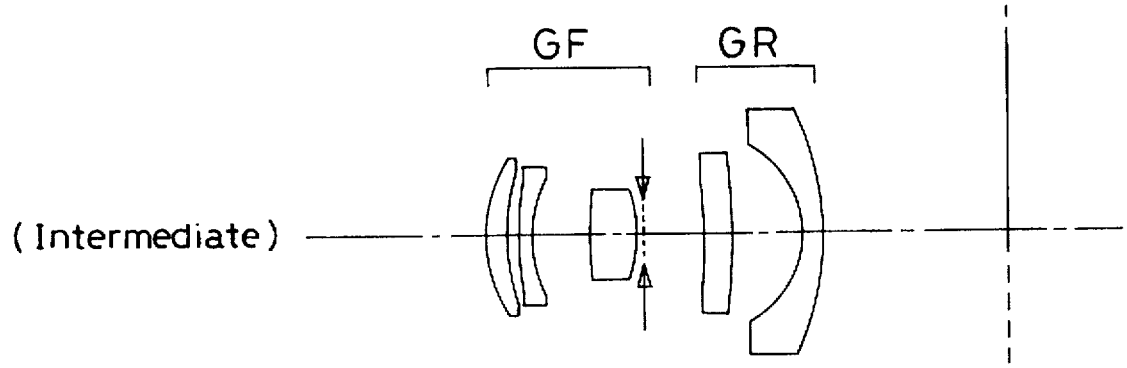
Figure 2C:
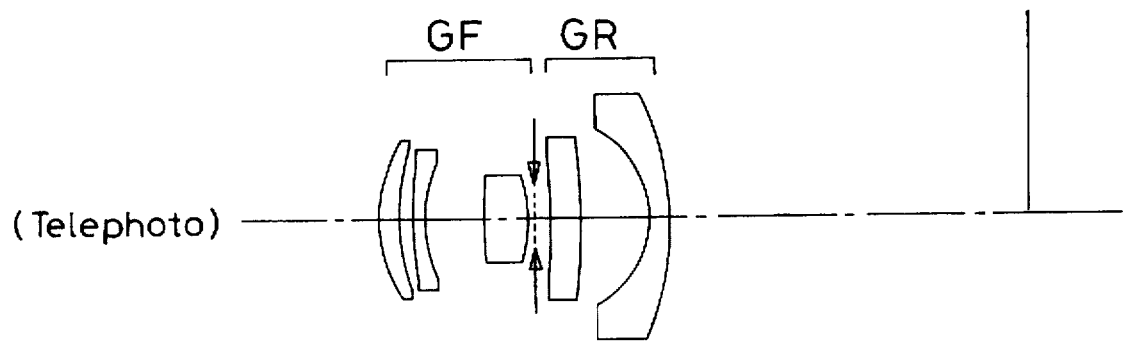

In Examples 3 and 4, a front lens group GF consists of, in order from an object side, a positive meniscus lens convex on the object side, a negative meniscus lens convex on the object side and a double convex lens or three lenses in all, with a stop located behind the front lens group GF as one integral piece, as can be seen from FIG. 2. A rear lens group GR consists of two negative meniscus lenses, each convex on an image side. Two aspherical surfaces are used, one for the front surface of the negative meniscus lens in the front lens group GF and one for the surface of the rear lens group GR that is located nearest to the object side. In Example 3 the first, second, fourth, and fifth lenses are formed of plastics, and in Example 4 the second, third, fourth, and fifth lenses are formed of plastics.

Figure 3A:
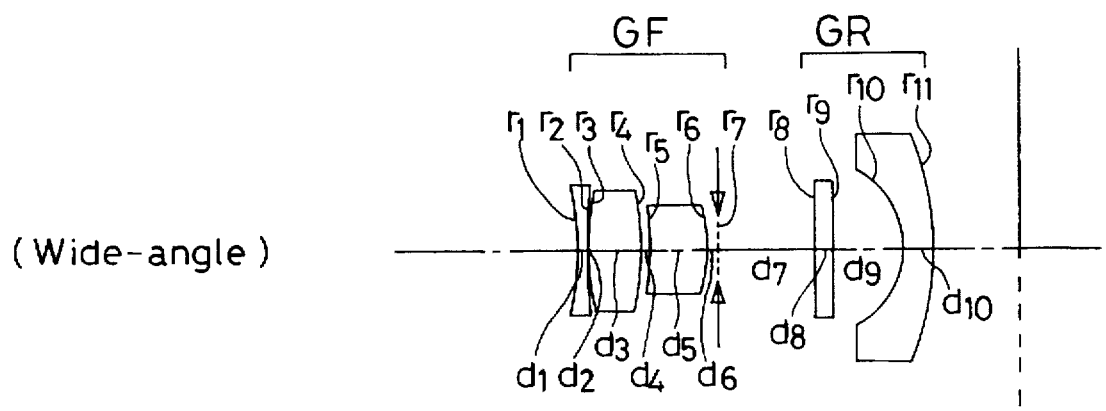
FIG. 3 is a sectional view of Example 5 of the invented zoom lens system similar to FIG. 1.
Figure 3B:
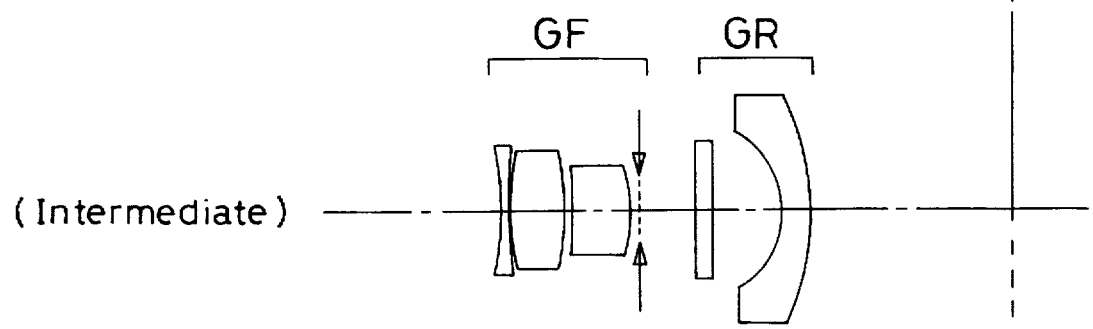
Figure 3C:
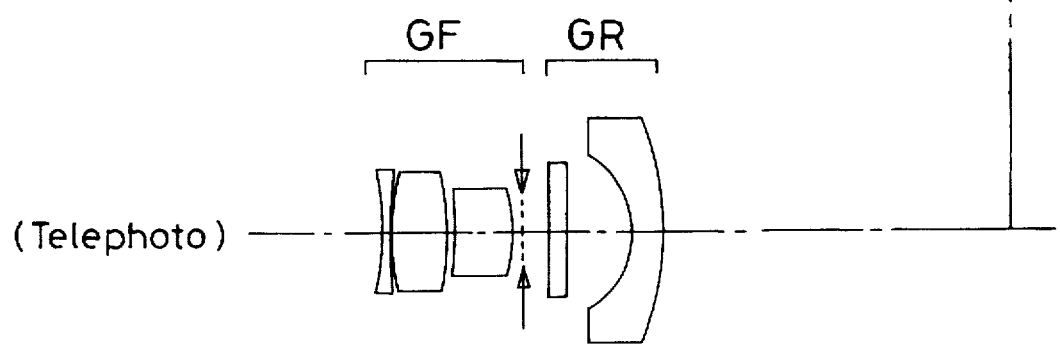

In Examples 5 and 6, a front lens group GF consists of, in order from an object side, a double concave lens, a double convex lens and a positive meniscus lens convex on an image side or three lenses in all, with a stop located behind the front lens group GF as one integral piece, as can be seen from FIG. 3. A rear lens group GR consists of two negative meniscus lenses, each convex on an image side. Two aspherical surfaces are used, one for the rear surface of the double concave lens in the front lens group GF and one for the surface of the rear lens group GR that is located nearest to the object side. In Example 5 the first, second, fourth, and fifth lenses are formed of plastics, and in Example 6 the first, third, fourth, and fifth lenses are formed of plastics.

Figure 4A:
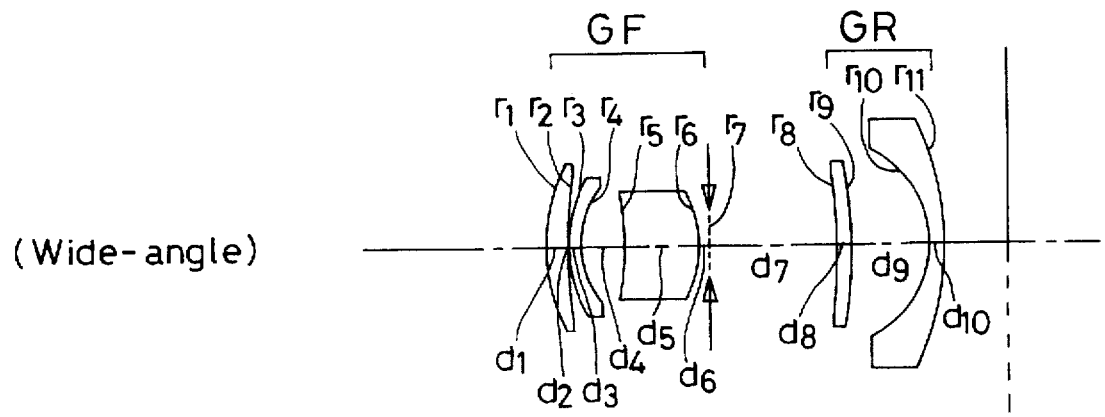
FIG. 4 is a sectional view of Example 7 of the invented zoom lens system similar to FIG. 1.
Figure 4B:
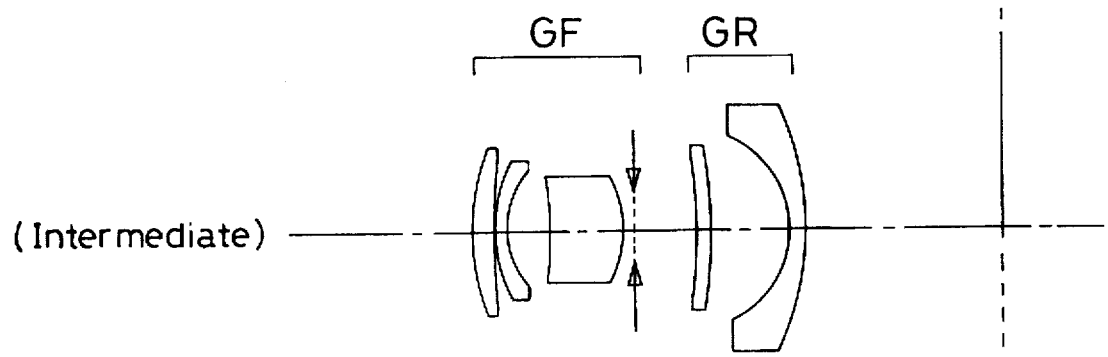
Figure 4C:
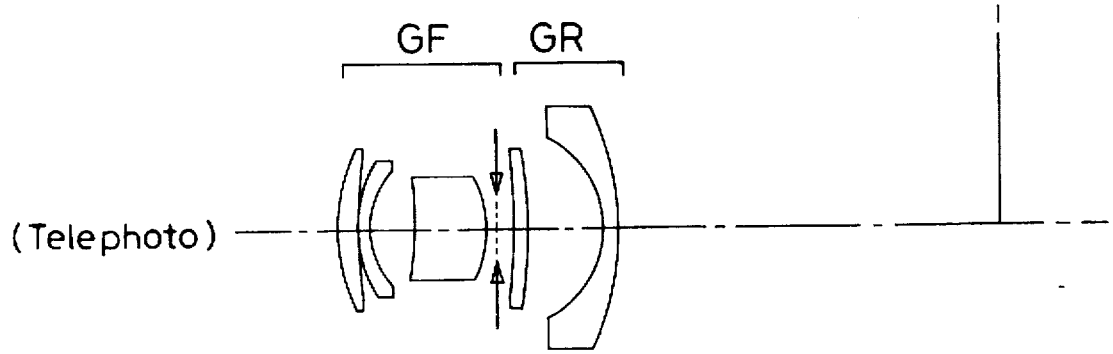

In Example 7, a front lens group GF consists of, in order from an object side, a positive meniscus lens convex on the object side, a negative meniscus lens convex on the object side and a positive meniscus lens convex on an image side or three lenses in all, with a stop located behind the front lens group GF as one integral piece, as can be seen from FIG. 4. A rear lens group GR consists of two negative meniscus lenses, each convex on an image side. Two aspherical surfaces are used, one for the front surface of the negative meniscus lens in the front lens group GF and one for the surface of the rear lens group GR that is located nearest to the object side. In the instant example, the lenses are all made of glass.

Figure 5A:
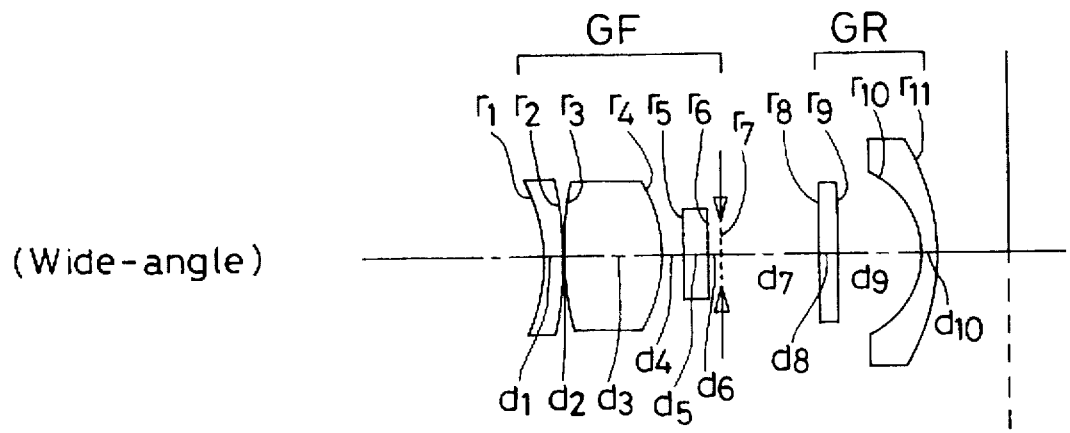
FIG. 5 is a sectional view of Example 8 of the invented zoom lens system similar to FIG. 1.
Figure 5B:
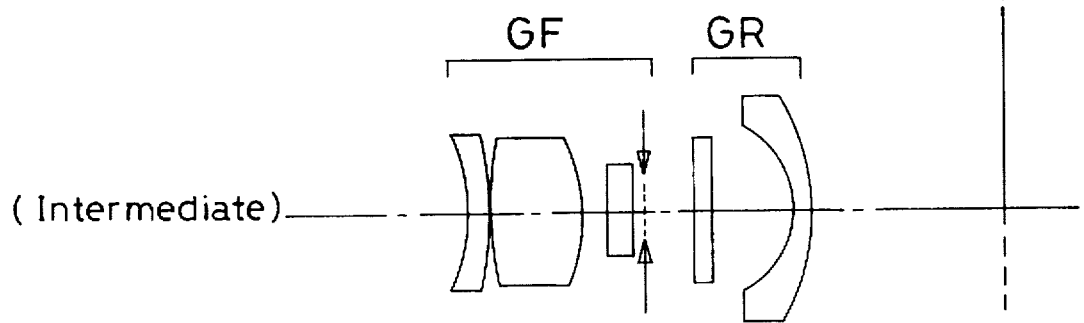
Figure 5C:
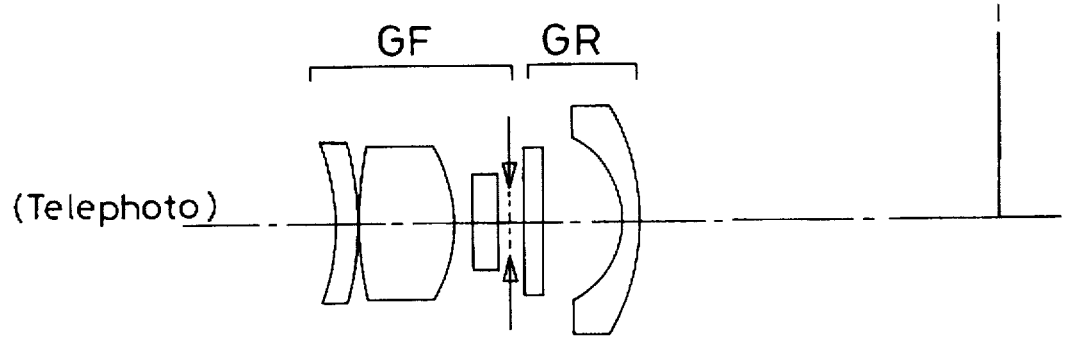

In Example 8, a front lens group GF consists of, in order from an object side, a negative meniscus lens convex on an image side, a double convex lens and a double convex lens or three lenses in all, with a stop located behind the front lens group GF as one integral piece, as can be seen from FIG. 5. A rear lens group GR consists of two negative meniscus lenses, each convex on an image side. Two aspherical surfaces are used, one for the front surface of the first double convex lens in the front lens group GF and one for the surface of the rear lens group GR that is located nearest to the object side. In the instant example, the lenses are all made of glass.

It is here to be noted that Examples 1 and 2 correspond to the first embodiment of the invention; Examples 3 and 4 to the first and second embodiments of the invention; and Examples 5 and 6 to the first and third embodiments of the invention. It is also to be noted that Example 7 corresponds to the inventive second embodiment alone; and Example 8 to the inventive third embodiment alone.

Set out below are numerical data concerning each example, and symbols used hereinafter but not hereinbefore represent:

f: the focal length of the entire system;

$F_{NO}$: the F-number;

ω: the half angle of field;

$f_B$: the back focus of the system upon focused at infinity;

$r_1, r_2, \ldots$ : the radii of curvature of the respective lens surfaces;

$d_1, d_2, \ldots$ : the spacings between the respective lenses;

$n_{d1}, n_{d2}, \ldots$ : the d-line indices of refraction of the respective lenses; and $v_{d1}, v_{d2}, \ldots$ : the Abbe's number of the respective lenses. Now let x represent the direction of propagation of light on the optical axis and y the direction perpendicular to the optical axis. Then, aspherical shape is given by $$x=(y^2/r)/[1+\{1-(y/r)^2\}^{1/2}]+A_4 y^4+A_6 y^6+A_8 y^8+A_{10} y^{10}$$

where r is the paraxial radius of curvature; and $A_4, A_6, A_8,$ and $A_{10}$ are the fourth, sixth, eighth, and tenth aspherical coefficients, respectively.

| Example 1 |
| --- |
| f = 38.99 ~ 51.60 ~ 68.23 |
| $F_{NO}$ = 6.00 ~ 7.92 ~ 10.27 |
| ω = 28.36° ~ 22.62° ~ 17.64° |
| $f_B$ = 6.132 ~ 20.554 ~ 39.577 |

| | | | |
| --- | --- | --- | --- |
| $r_1$ = 14.9281 | $d_1$ = 1.7480 | $n_{d1}$ = 1.74100 | $v_{d1}$ = 52.65 |
| $r_2$ = 20.5711 | $d_2$ = 1.8847 | | |
| $r_3$ = −171.5381(Aspheric) | $d_3$ = 1.2869 | $n_{d2}$ = 1.58423 | $v_{d2}$ = 30.49 |
| $r_4$ = 23.1097 | $d_4$ = 3.6542 | | |
| $r_5$ = 42.9606 | $d_5$ = 4.1814 | $n_{d3}$ = 1.49241 | $v_{d3}$ = 57.66 |
| $r_6$ = −14.6091 | $d_6$ = 1.0000 | | |
| $r_7$ = ∞ (Stop) | $d_7$ = (Variable) | | |
| $r_8$ = −55.3438(Aspheric) | $d_8$ = 3.0826 | $n_{d4}$ = 1.49241 | $v_{d4}$ = 57.66 |
| $r_9$ = −60.1255 | $d_9$ = 7.7437 | | |
| $r_{10}$ = −10.9330 | $d_{10}$ = 1.8814 | $n_{d5}$ = 1.49241 | $v_{d5}$ = 57.66 |
| $r_{11}$ = −28.7817 | | | |

| Zooming Spaces | | | |
| --- | --- | --- | --- |
| f | 38.99 | 51.60 | 68.23 |
| $d_7$ | 13.419 | 6.488 | 1.263 |

| Aspherical Coefficients |
| --- |
| 3rd surface |
| $A_4$ = −0.91119 × 10$^{-4}$ |
| $A_6$ = −0.62099 × 10$^{-6}$ |
| $A_8$ = 0.10269 × 10$^{-7}$ |
| $A_{10}$ = −0.87293 × 10$^{-10}$ |
| 8th surface |
| $A_4$ = 0.43287 × 10$^{-4}$ |
| $A_6$ = 0.27643 × 10$^{-6}$ |
| $A_8$ = 0.38190 × 10$^{-9}$ |
| $A_{10}$ = 0.53172 × 10$^{-11}$ |
| $f_{NP}/f_T$ = −0.510 |
| $f_{PP}/f_T$ = 0.332 |
| $\|f_{RP}/f_{PP}\|$ = 0.811 |

Example 2

$f = 39.06 \sim 51.54 \sim 69.08$
$F_{NO} = 6.00 \sim 7.92 \sim 10.27$
$\omega = 28.33° \sim 22.72° \sim 17.48°$
$f_B = 6.216 \sim 20.330 \sim 40.167$

| | | | |
|---|---|---|---|
| $r_1 = 13.2870$ | $d_1 = 1.8786$ | $n_{d1} = 1.53256$ | $\nu_{d1} = 45.91$ |
| $r_2 = 21.6526$ | $d_2 = 2.0169$ | | |
| $r_3 = -192.5812$(Aspheric) | $d_3 = 1.1521$ | $n_{d2} = 1.58423$ | $\nu_{d2} = 30.49$ |
| $r_4 = 19.6616$ | $d_4 = 4.4237$ | | |
| $r_5 = 36.6235$ | $d_5 = 2.9779$ | $n_{d3} = 1.49241$ | $\nu_{d3} = 57.66$ |
| $r_6 = -14.6878$ | $d_6 = 1.0000$ | | |
| $r_7 = \infty$ (Stop) | $d_7 =$ (Variable) | | |
| $r_8 = -52.7977$(Aspheric) | $d_8 = 3.6586$ | $n_{d4} = 1.49241$ | $\nu_{d4} = 57.66$ |
| $r_9 = -55.0000$ | $d_9 = 7.6922$ | | |
| $r_{10} = -11.0746$ | $d_{10} = 1.9348$ | $n_{d5} = 1.49241$ | $\nu_{d5} = 57.66$ |
| $r_{11} = -31.0748$ | | | |

Zooming Spaces

| f | 39.06 | 51.54 | 69.08 |
|---|---|---|---|
| $d_7$ | 13.434 | 6.705 | 1.358 |

Aspherical Coefficients

3rd surface $A_4 = -0.99806 \times 10^{-4}$
$A_6 = -0.56300 \times 10^{-6}$
$A_8 = 0.10296 \times 10^{-7}$
$A_{10} = -0.87238 \times 10^{-10}$ 8th surface $A_4 = 0.43924 \times 10^{-4}$
$A_6 = 0.13047 \times 10^{-6}$
$A_8 = 0.27814 \times 10^{-8}$
$A_{10} = -0.98672 \times 10^{-11}$
$f_{NP}/f_T = -0.441$
$f_{PP}/f_T = 0.314$
$|f_{RP}/f_{FP}| = 0.779$

Example 3

$f = 38.86 \sim 51.49 \sim 69.61$
$F_{NO} = 6.18 \sim 8.19 \sim 11.07$
$\omega = 28.42° \sim 22.60° \sim 17.27°$
$f_B = 6.650 \sim 19.874 \sim 38.840$

| | | | |
|---|---|---|---|
| $r_1 = 16.3766$ | $d_1 = 2.2185$ | $n_{d1} = 1.49241$ | $\nu_{d1} = 57.66$ |
| $r_2 = 29.1989$ | $d_2 = 1.2813$ | | |
| $r_3 = 47.7565$(Aspheric) | $d_3 = 1.4521$ | $n_{d2} = 1.58423$ | $\nu_{d2} = 30.49$ |
| $r_4 = 17.2215$ | $d_4 = 6.0409$ | | |
| $r_5 = 62.9062$ | $d_5 = 5.0107$ | $n_{d3} = 1.51633$ | $\nu_{d3} = 64.15$ |
| $r_6 = -15.5682$ | $d_6 = 0.6683$ | | |
| $r_7 = \infty$ (Stop) | $d_7 =$ (Variable) | | |
| $r_8 = -74.6094$(Aspheric) | $d_8 = 3.2627$ | $n_{d4} = 1.49241$ | $\nu_{d4} = 57.66$ |
| $r_9 = -87.7749$ | $d_9 = 7.6275$ | | |
| $r_{10} = -10.6889$ | $d_{10} = 1.9893$ | $n_{d5} = 1.49241$ | $\nu_{d5} = 57.66$ |
| $r_{11} = -33.2819$ | | | |

Zooming Spaces

| f | 38.86 | 51.49 | 69.61 |
|---|---|---|---|
| $d_7$ | 12.059 | 6.131 | 1.386 |

Aspherical Coefficients

3rd surface $A_4 = -0.71095 \times 10^{-4}$
$A_6 = -0.39148 \times 10^{-6}$
$A_8 = 0.22338 \times 10^{-8}$
$A_{10} = -0.16434 \times 10^{-10}$ 8th surface $A_4 = 0.46674 \times 10^{-4}$
$A_6 = 0.33916 \times 10^{-6}$
$A_8 = -0.19893 \times 10^{-8}$
$A_{10} = 0.23819 \times 10^{-10}$ $f_{NP}/f_T = -0.674$
$f_{PP}/f_T = 1.029$
$|f_{RP}/f_{FP}| = 0.175$

Example 4

$f = 39.26 \sim 51.82 \sim 67.21$
$F_{NO} = 6.00 \sim 7.92 \sim 10.27$
$\omega = 28.19° \sim 22.49° \sim 17.85°$
$f_B = 6.478 \sim 20.296 \sim 37.220$

| | | | |
|---|---|---|---|
| $r_1 = 14.0261$ | $d_1 = 2.1561$ | $n_{d1} = 1.51633$ | $\nu_{d1} = 64.15$ |
| $r_2 = 23.5368$ | $d_2 = 1.8645$ | | |
| $r_3 = 428.2562$(Aspheric) | $d_3 = 1.3620$ | $n_{d2} = 1.58423$ | $\nu_{d2} = 30.49$ |
| $r_4 = 22.1245$ | $d_4 = 4.9311$ | | |
| $r_5 = 51.4279$ | $d_5 = 3.0593$ | $n_{d3} = 1.49241$ | $\nu_{d3} = 57.66$ |
| $r_6 = -15.3320$ | $d_6 = 1.0000$ | | |
| $r_7 = \infty$ (Stop) | $d_7 =$ (Variable) | | |
| $r_8 = -52.7977$(Aspheric) | $d_8 = 2.3036$ | $n_{d4} = 1.49241$ | $\nu_{d4} = 57.66$ |
| $r_9 = -55.000$ | $d_9 = 8.0453$ | | |
| $r_{10} = -10.8729$ | $d_{10} = 1.9507$ | $n_{d5} = 1.49241$ | $\nu_{d5} = 57.66$ |
| $r_{11} = -31.3119$ | | | |

Zooming Spaces

| f | 39.26 | 51.82 | 67.21 |
|---|---|---|---|
| $d_7$ | 12.565 | 6.043 | 1.377 |

Aspherical Coefficients

3rd surface $A_4 = -0.88469 \times 10^{-4}$
$A_6 = -0.34989 \times 10^{-6}$
$A_8 = 0.41379 \times 10^{-8}$
$A_{10} = -0.35902 \times 10^{-10}$ 8th surface $A_4 = 0.43086 \times 10^{-4}$
$A_6 = 0.35935 \times 10^{-6}$
$A_8 = -0.13105 \times 10^{-8}$
$A_{10} = 0.14549 \times 10^{-10}$
$f_{NP}/f_T = -0.595$
$f_{PP}/f_T = 0.362$
$|f_{RP}/f_{FP}| = 0.774$

Example 5

$f = 39.41 \sim 51.50 \sim 67.48$
$F_{NO} = 6.43 \sim 8.40 \sim 11.01$
$\omega = 28.05° \sim 22.56° \sim 17.74°$
$f_B = 9.063 \sim 21.224 \sim 37.301$

| | | | |
|---|---|---|---|
| $r_1 = -30.8268$ | $d_1 = 1.0000$ | $n_{d1} = 1.58423$ | $\nu_{d1} = 30.49$ |
| $r_2 = 151.3777$(Aspheric) | $d_2 = 0.2000$ | | |
| $r_3 = 32.3126$ | $d_3 = 5.8362$ | $n_{d2} = 1.49241$ | $\nu_{d2} = 57.66$ |
| $r_4 = -29.3156$ | $d_4 = 0.6000$ | | |
| $r_5 = -99.6220$ | $d_5 = 6.6201$ | $n_{d3} = 1.48749$ | $\nu_{d3} = 70.21$ |
| $r_6 = -15.4004$ | $d_6 = 1.0000$ | | |
| $r_7 = \infty$ (Stop) | $d_7 =$ (Variable) | | |
| $r_8 = -119.0289$(Aspheric) | $d_8 = 2.0000$ | $n_{d4} = 1.49241$ | $\nu_{d4} = 57.66$ |
| $r_9 = -182.8000$ | $d_9 = 7.4878$ | | |
| $r_{10} = -9.2019$ | $d_{10} = 3.1369$ | $n_{d5} = 1.49241$ | $\nu_{d5} = 57.66$ |
| $r_{11} = -29.7695$ | | | |

Zooming Spaces

| f | 39.41 | 51.50 | 67.48 |
|---|---|---|---|
| $d_7$ | 10.338 | 6.028 | 2.700 |

Aspherical Coefficients

2nd surface $A_4 = 0.87470 \times 10^{-4}$
$A_6 = 0.21386 \times 10^{-6}$
$A_8 = 0.38566 \times 10^{-8}$
$A_{10} = 0.69078 \times 10^{-11}$ -continued

8th surface $A_4 = 0.69406 \times 10^{-4}$
$A_6 = 0.27756 \times 10^{-6}$
$A_8 = 0.67331 \times 10^{-8}$
$A_{10} = -0.43529 \times 10^{-10}$
$f_{NP}/f_T = -0.648$
$f_{PP}/f_T = 0.477$
$| f_{RP}/f_{PP} | = 0.275$

Example 6

$f = 39.38 \sim 51.47 \sim 67.47$
$F_{NO} = 6.44 \sim 8.41 \sim 11.03$
$\omega = 28.04° \sim 22.55° \sim 17.74°$
$f_B = 9.189 \sim 21.629 \sim 38.081$

| | | | |
|---|---|---|---|
| $r_1 = -28.8751$ | $d_1 = 1.0000$ | $n_{d1} = 1.58423$ | $\nu_{d1} = 30.49$ |
| $r_2 = 182.9230$(Aspheric) | $d_2 = 0.2000$ | | |
| $r_3 = 26.6331$ | $d_3 = 5.7131$ | $n_{d2} = 1.51633$ | $\nu_{d2} = 64.15$ |
| $r_4 = -38.5448$ | $d_4 = 0.6000$ | | |
| $r_5 = -108.4731$ | $d_5 = 5.5936$ | $n_{d3} = 1.49241$ | $\nu_{d3} = 57.66$ |
| $r_6 = -15.5471$ | $d_6 = 1.0000$ | | |
| $r_7 = \infty$ (Stop) | $d_7$ = (Variable) | | |
| $r_8 = -157.5688$(Aspheric) | $d_8 = 2.0000$ | $n_{d4} = 1.49241$ | $\nu_{d4} = 57.66$ |
| $r_9 = -291.5649$ | $d_9 = 6.9244$ | | |
| $r_{10} = -8.7684$ | $d_{10} = 3.0719$ | $n_{d5} = 1.49241$ | $\nu_{d5} = 57.66$ |
| $r_{11} = -25.2136$ | | | |

Zooming Spaces

| f | 39.38 | 51.47 | 67.47 |
|---|---|---|---|
| $d_7$ | 10.534 | 6.113 | 2.700 |

Aspherical Coefficients

2nd surface $A_4 = 0.82035 \times 10^{-4}$
$A_6 = 0.31574 \times 10^{-6}$
$A_8 = 0.24491 \times 10^{-8}$
$A_{10} = 0.22830 \times 10^{-10}$

8th surface $A_4 = 0.68982 \times 10^{-4}$
$A_6 = 0.81112 \times 10^{-6}$
$A_8 = -0.64267 \times 10^{-8}$
$A_{10} = 0.11991 \times 10^{-9}$
$f_{NP}/f_T = -0.632$
$f_{PP}/f_T = 0.536$
$| f_{RP}/f_{PP} | = —$

Example 7

$f = 38.57 \sim 51.58 \sim 69.58$
$F_{NO} = 5.60 \sim 7.48 \sim 10.09$
$\omega = 28.64° \sim 22.47° \sim 17.22°$
$f_B = 6.529 \sim 21.003 \sim 41.037$

| | | | |
|---|---|---|---|
| $r_1 = 21.6033$ | $d_1 = 2.3741$ | $n_{d1} = 1.51633$ | $\nu_{d1} = 64.15$ |
| $r_2 = 63.5331$ | $d_2 = 0.2000$ | | |
| $r_3 = 13.5809$(Aspheric) | $d_3 = 1.1727$ | $n_{d2} = 1.71736$ | $\nu_{d2} = 29.51$ |
| $r_4 = 9.6274$ | $d_4 = 4.5920$ | | |
| $r_5 = -60.2607$ | $d_5 = 8.4198$ | $n_{d3} = 1.48749$ | $\nu_{d3} = 70.21$ |
| $r_6 = -11.4005$ | $d_6 = 1.0000$ | | |
| $r_7 = \infty$ (Stop) | $d_7$ = (Variable) | | |
| $r_8 = -52.7977$(Aspheric) | $d_8 = 1.5739$ | $n_{d4} = 1.60311$ | $\nu_{d4} = 60.68$ |
| $r_9 = -55.0000$ | $d_9 = 8.3789$ | | |
| $r_{10} = -11.0544$ | $d_{10} = 1.7399$ | $n_{d5} = 1.51633$ | $\nu_{d5} = 64.15$ |
| $r_{11} = -30.1186$ | | | |

Zooming Spaces

| f | 38.57 | 51.58 | 69.58 |
|---|---|---|---|
| $d_7$ | 13.619 | 6.808 | 1.582 |

Aspherical Coefficients

3rd surface $A_4 = -0.60805 \times 10^{-4}$
$A_6 = -0.67642 \times 10^{-6}$
$A_8 = -0.74438 \times 10^{-8}$
$A_{10} = -0.55893 \times 10^{-10}$

8th surface $A_4 = 0.32131 \times 10^{-4}$
$A_6 = 0.48150 \times 10^{-6}$
$A_8 = -0.36242 \times 10^{-8}$
$A_{10} = 0.24886 \times 10^{-10}$

Example 8

$f = 38.09 \sim 51.39 \sim 69.89$
$F_{NO} = 5.49 \sim 7.41 \sim 10.08$
$\omega = 28.97° \sim 22.73° \sim 17.24°$
$f_B = 7.093 \sim 20.030 \sim 38.004$

| | | | |
|---|---|---|---|
| $r_1 = -19.5652$ | $d_1 = 2.0588$ | $n_{d1} = 1.75520$ | $\nu_{d1} = 27.51$ |
| $r_2 = -39.3687$ | $d_2 = 0.2000$ | | |
| $r_3 = 37.3468$(Aspheric) | $d_3 = 10.3615$ | $n_{d2} = 1.51633$ | $\nu_{d2} = 64.15$ |
| $r_4 = -17.7613$ | $d_4 = 2.1758$ | | |
| $r_5 = 3962.9778$ | $d_5 = 2.9868$ | $n_{d3} = 1.60311$ | $\nu_{d3} = 60.68$ |
| $r_6 = -68.0992$ | $d_6 = 1.0000$ | | |
| $r_7 = \infty$ (Stop) | $d_7$ = (Variable) | | |
| $r_8 = -120.0000$(Aspheric) | $d_8 = 1.9590$ | $n_{d4} = 1.60311$ | $\nu_{d4} = 60.68$ |
| $r_9 = -182.0000$ | $d_9 = 8.4945$ | | |
| $r_{10} = -10.3856$ | $d_{10} = 2.0911$ | $n_{d5} = 1.69680$ | $\nu_{d5} = 55.53$ |
| $r_{11} = -23.2689$ | | | |

Zooming Spaces

| f | 38.09 | 51.39 | 69.89 |
|---|---|---|---|
| $d_7$ | 10.610 | 5.499 | 1.630 |

Aspherical Coefficients

3rd surface $A_4 = -0.52662 \times 10^{-4}$
$A_6 = -0.32023 \times 10^{-6}$
$A_8 = 0.10470 \times 10^{-8}$
$A_{10} = -0.45450 \times 10^{-11}$

Figure 6:
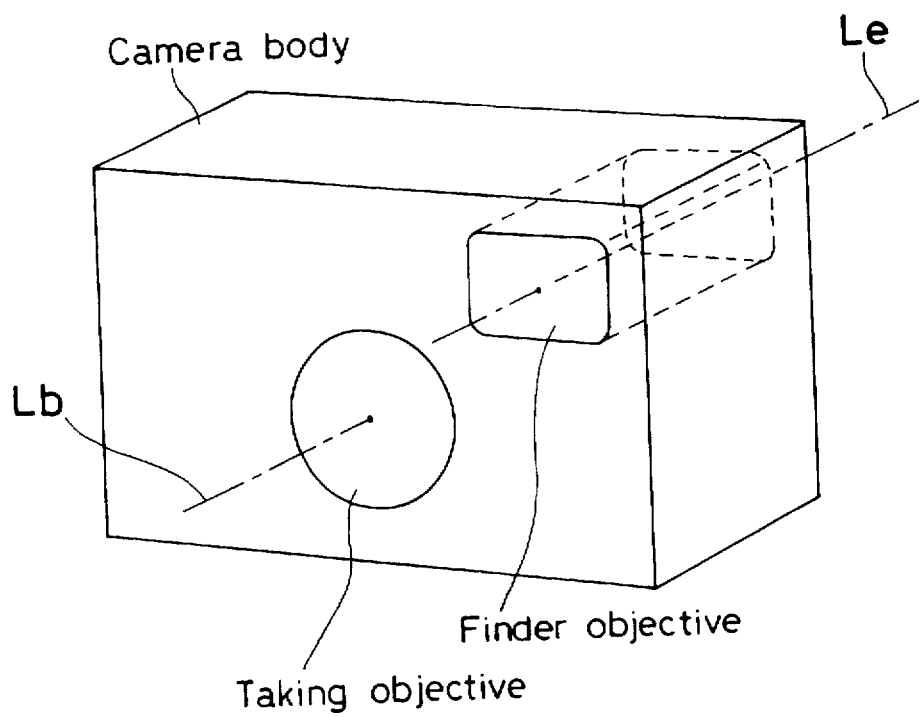
FIG. 6 is a perspective view of one exemplary construction of a compact camera.
Figure 7:
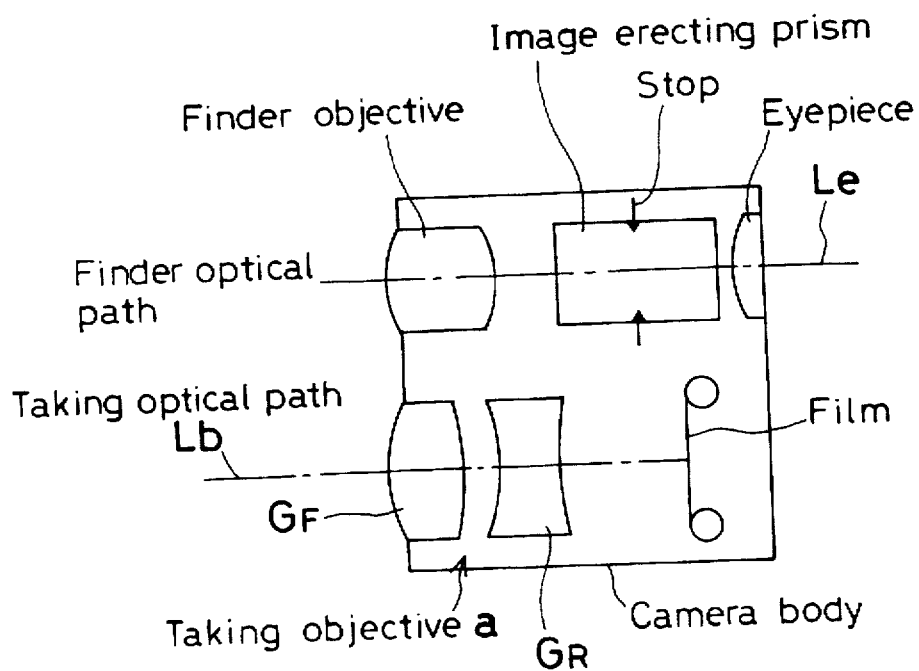
FIG. 7 is a perspective view of one exemplary construction of a compact camera.

8th surface $A_4 = 0.39428 \times 10^{-4}$
$A_6 = 0.79603 \times 10^{-6}$
$A_8 = -0.15022 \times 10^{-7}$
$A_{10} = 0.13151 \times 10^{-9}$ The invented zoom lens system as explained above, for instance, may be used as a photograph-taking objective a of a compact camera of the construction shown in section in FIG. 7 and in perspective in FIG. 6. Here $G_F$ represents the front positive lens group as a whole and $G_R$ the rear negative lens group as a whole. $L_b$ and $L_e$ stand for a taking optical path and a finder optical path which are arranged parallel with each other. The image of a subject is observed through a finder made up of a finder objective, an image-erecting prism, a stop, and an eyepiece, and is then formed on film through the objective a.

As explained in detail and as can be understood from each example, the first to third embodiments of the invention provide compact, lightweight yet low-cost zoom lens systems which have a zoom ratio of at least about 2 and are well corrected for various aberrations, and are sufficiently compensated for temperature when plastic lenses are used.

The entirety of JP-7-139451 filed Jun. 6, 1995, from which priority under 35 USC 119 is claimed, is incorporated herein by reference.

What we claim is:

1. A zoom lens system comprising, in order from an object side:
   - a front lens group including a plurality of positive lenses containing at least a plastic lens and having a positive refracting power as a whole; and
   - a rear lens group comprising a plurality of negative lenses containing at least a plastic lens and having no positive lens at all,
   - wherein zooming is carried out by varying a spacing between the front and rear lens groups, and all the lenses satisfy the following condition (1):

$$n_d < 1.75 \quad (1)$$

where $n_d$ is the d-line indices of refraction of the lenses.

2. A zoom lens system comprising, in order from an object side:
   - a front lens group including a positive lens located nearest to the object side and a negative lens located on an image side with respect to said positive lens, a surface of said negative lens lying on the object side being convex on the object side, said front lens group having a positive refracting power as a whole; and
   - a rear lens group comprising a plurality of negative lenses, and having no positive lens at all, wherein zooming is carried out by varying a spacing between the front and rear lens groups.

3. A zoom lens system according to claim 1 or 2, wherein the front lens group comprises two positive lenses and one negative lens, and the rear lens group comprises two negative lenses.

4. A zoom lens system according to claim 1 or 2, wherein, in order from the object side, the front lens group comprises a positive lens, a negative lens and a positive lens, and the rear lens group comprises two negative lenses.

5. A zoom lens system according to claim 1 or 2, wherein the positive lens of the front lens group located nearest to the object side is a glass lens.

6. A zoom lens system according to claim 1 or 2, wherein at least one aspherical surface is used for the second lens.

7. A zoom lens system comprising, in order from an object side;
   - a front lens group including a negative lens located nearest to the object side and a plurality of positive lenses located on an image side with respect to said negative lens and having a positive refracting power as a whole; and
   - a rear lens group comprising a plurality of negative lenses, and having no positive lens at all, wherein zooming is carried out by varying a spacing between the front and rear lens groups.

8. A zoom lens system according to claim 7, wherein the front lens group comprises, in order from the object side, a negative lens, a positive lens and a positive lens, and the rear lens group consists of two negative lenses alone.

9. A zoom lens system according to claim 1, 2 or 8, which conforms to the following condition (2):

$$-1 < f_{NP}/f_T < 0 \quad (2)$$

where $f_{NP}$ is the focal length of at least one plastic lens used for the negative lens in the front lens group; and $f_T$ is the focal length of the entire system at a telephoto end thereof.

10. A zoom lens system according to claim 1, 2 or 8, which conforms to the following condition (2):

$$0 < f_{PP}/f_T < 2 \quad (3)$$

where $f_{PP}$ is the focal length of the plastic lens having the shortest focal length among the plastic lenses used for the positive lenses in the front lens group.

11. A zoom lens system according to claim 1, 2 or 8, which conforms to the following condition (4):

$$0 < |f_{RP}/f_{PP}| < 1 \quad (4)$$

where $f_{RP}$ is the composite focal length of the plastic lenses used in the rear lens group; and $f_{FP}$ is the composite focal length of the plastic lenses used in the front lens group.

12. A zoom lens system according to claim 1, 2 or 7, wherein the rear lens group comprises a negative lens which is meniscus-shaped with a concave surface facing the object side.

13. A zoom lens system according to claim 1, 2, 7 or 8, wherein one of the positive lenses is a glass lens with the rest being a plastic lens.

14. A zoom lens system according to claim 1, 2, 7 or 8, wherein an aspherical surface is used for at least one surface in the front lens group.

15. A zoom lens system according to claim 1, 2, 7 or 8, wherein an aspherical surface is used for at least one surface in the rear lens group.

16. A zoom lens system according to claim 1, 2, 7 or 8, wherein at least one aspherical surface is used in each of the front and rear lens groups.

17. A zoom lens system according to claim 1, 2, 7 or 8, wherein at least one aspherical surface is used for the lens located nearest to the object side.

18. A zoom lens system according to claim 1, 2, 7 or 8, wherein at least one aspherical surface is used for the positive lenses in the front lens group.

19. A zoom lens system according to claim 1, 2, 7 or 8, wherein at least one aspherical surface is used for the negative lenses in the front lens group.

20. A zoom lens system according to claim 1, 2, 7 or 8, wherein at least one aspherical surface is used for the lens in the rear lens group that is located nearest to the object side.

21. A zoom lens system according to claim 1, 2, 7 or 8, wherein an aspherical surface is used for at least one of the plastic lenses.

* * * * *